United States Patent
Chen

(10) Patent No.: US 11,400,374 B2
(45) Date of Patent: Aug. 2, 2022

(54) VIRTUAL CHARACTER PROCESSING METHOD, VIRTUAL CHARACTER PROCESSING DEVICE, ELECTRONIC APPARATUS AND STORAGE MEDIUM

(71) Applicant: NETEASE (HANGZHOU) NETWORK CO., LTD., Hangzhou (CN)

(72) Inventor: Yian Chen, Hangzhou (CN)

(73) Assignee: NETEASE (HANGZHOU) NETWORK CO., LTD., Zhejiang (CN)

(*) Notice: Subject to any disclaimer, the term of this patent is extended or adjusted under 35 U.S.C. 154(b) by 42 days.

(21) Appl. No.: 16/639,409

(22) PCT Filed: Mar. 28, 2019

(86) PCT No.: PCT/CN2019/079968
§ 371 (c)(1),
(2) Date: Feb. 14, 2020

(87) PCT Pub. No.: WO2020/103367
PCT Pub. Date: May 28, 2020

(65) Prior Publication Data
US 2021/0146248 A1  May 20, 2021

(30) Foreign Application Priority Data
Nov. 22, 2018 (CN) .......... 201811398012.9

(51) Int. Cl.
*A63F 13/537* (2014.01)
*A63F 13/2145* (2014.01)
(Continued)

(52) U.S. Cl.
CPC ........ *A63F 13/537* (2014.09); *A63F 13/2145* (2014.09); *A63F 13/533* (2014.09); *A63F 13/56* (2014.09); *A63F 13/58* (2014.09)

(58) Field of Classification Search
CPC .. A63F 13/537; A63F 13/2145; A63F 13/533; A63F 13/56; A63F 13/58
See application file for complete search history.

(56) References Cited

U.S. PATENT DOCUMENTS

2007/0075985 A1* 4/2007 Niida .............. A63F 13/533
345/173
2008/0119268 A1* 5/2008 Kando ............ A63F 13/00
463/31
(Continued)

FOREIGN PATENT DOCUMENTS

CN  105194873 A  12/2015
CN  106512406 A  3/2017
(Continued)

OTHER PUBLICATIONS

The ISR dated Aug. 7, 2019 by the WPO office.
(Continued)

*Primary Examiner* — Yingchuan Zhang
(74) *Attorney, Agent, or Firm* — Qinghong Xu

(57) ABSTRACT

A virtual character processing method comprises: generating a first virtual skill region in response to a first touch operation on a virtual skill button on a user interface; identifying a plurality of virtual characters in the current view region and survival coefficients of the plurality of virtual characters; dividing the first virtual skill region into a plurality of sub-regions corresponding to each of the virtual characters based on the virtual characters and the survival coefficients; determining a sub-region corresponding to a selection operation as a target region; and determining the virtual character corresponding to the target (Continued)

region as a target character, and locking the target character. Through the disclosure, a virtual character moving in the game can be quickly locked as a target character, and difficulty for the player to lock a target character is reduced.

20 Claims, 14 Drawing Sheets

(51) Int. Cl.
  *A63F 13/533* (2014.01)
  *A63F 13/56* (2014.01)
  *A63F 13/58* (2014.01)

(56) References Cited

U.S. PATENT DOCUMENTS

| | | |
|---|---|---|
| 2013/0169668 A1 | 7/2013 | Lynch |
| 2015/0157932 A1 | 6/2015 | Kwon et al. |
| 2015/0234683 A1 | 8/2015 | Chishti et al. |
| 2018/0001189 A1* | 1/2018 | Tang .................... A63F 13/426 |

FOREIGN PATENT DOCUMENTS

| | | |
|---|---|---|
| CN | 107008003 A | 8/2017 |
| CN | 107168611 A | 9/2017 |
| CN | 107450812 A | 12/2017 |
| CN | 107617213 A | 1/2018 |
| CN | 107728895 A | 2/2018 |
| CN | 107823884 A | 3/2018 |
| CN | 107913520 A | 4/2018 |
| CN | 107930122 A | 4/2018 |
| CN | 107967096 A | 4/2018 |
| CN | 108144293 A | 6/2018 |
| CN | 108355348 A | 8/2018 |
| CN | 108434732 A | 8/2018 |
| CN | 109513209 A | 3/2019 |

OTHER PUBLICATIONS

The CN1OA dated Jun. 27, 2019 by the CNIPA.
The 1st Office Action dated Jul. 13, 2018 for CN application No. 201710496350.5.
The Non-Final OA dated Sep. 11, 2019 for U.S. Appl. No. 15/965,863.

* cited by examiner

VIRTUAL CHARACTER PROCESSING METHOD, VIRTUAL CHARACTER PROCESSING DEVICE, ELECTRONIC APPARATUS AND STORAGE MEDIUM

CROSS-REFERENCE TO RELATED APPLICATIONS

The present application is the 371 application of PCT Application No. PCT/CN2019/079968, filed on Mar. 28, 2019, which is based on and claims priority to Chinese Patent Application No. 201811398012.9, filed on Nov. 22, 2018, entitled "Virtual Character Processing Method and Virtual Character Processing Device, Electronic Apparatus. and Storage Medium", entire contents of both of which are incorporated by reference.

TECHNICAL FIELD

Embodiments of the present disclosure relate to a game interface interaction control technology, and more particularly, to a virtual character processing method and a virtual character processing device, an electronic apparatus and a storage medium.

BACKGROUND

In the Multiplayer Online Battle Arena (MOBA), most of the skills are manipulated by directly clicking on the skill icon and are released. When the target-oriented skill is released, if the target is aligned with a crosshair, the skill will be successfully released and enters skill Cool Down (CD); if the target is not aligned with the crosshair, the skill will still be released and enter the skill CD, however, such a release will be an invalid operation as no target aligned.

It should be noted that the information disclosed in the Background section above is merely for enhancement of understanding of the background of the present disclosure, and thus may include information that does not constitute prior art known to one of ordinary skill in the art.

SUMMARY

Objects of the present disclosure is to provide a virtual character processing method, a virtual character processing device, an electronic apparatus, and a computer readable storage medium to solve the problem that a continuously moving virtual character cannot be locked quickly in game process of existing games.

According to an aspect of the present disclosure, a virtual character processing method comprising: generating a first virtual skill region in response to a first touch operation on a virtual skill button on a user interface; identifying a plurality of virtual characters in the current view region and survival coefficients of the plurality of virtual characters; dividing the first virtual skill region into a plurality of sub-regions corresponding to each of the virtual characters based on the virtual characters and the survival coefficients; and in response to a selection operation on the plurality of sub-regions, determining the sub-regions corresponding to the selection operation as a target area; and identifying the virtual character corresponding to the target area as a target character, and locking the target character.

According to an aspect of the present disclosure, a virtual character processing device comprising: a skill region generating module, configured to generate a first virtual skill region in response to a first touch operation on a virtual skill button on a user interface; a virtual character identifying module, configured to identify a plurality of virtual characters in the current view region and survival coefficients of the plurality of virtual characters; a subregion dividing module, configured to divide the first virtual skill region into a plurality of sub-regions corresponding to each of the plurality of virtual characters based on the virtual characters and the survival coefficients; a target region determining module, configured to determine subregions corresponding to a selection operation as a target region in response to the selection operation on a plurality of subregions; and a target character locking module, configured to identify a virtual character corresponding to the target region as a target character, and locking the target character.

According to an aspect of the present disclosure, an electronic apparatus is provided, comprising: one or more processors, one or more machine-readable medium having instructions stored thereon that, when executed by the one or more processors, the instructions cause the electronic apparatus to perform the follow steps: generating a first virtual skill region in response to a first touch operation on a virtual skill button on a user interface; identifying a plurality of virtual characters in the current view field and survival coefficients of the plurality of virtual characters; dividing the first virtual skill region into a plurality of sub-regions corresponding to each of the virtual characters based on the virtual characters and the survival coefficients; and in response to a selection operation on the plurality of sub-regions, determining the sub-regions corresponding to the selection operation as a target area; and identifying the virtual character corresponding to the target area as a target character, and locking the target character.

The present disclosure provides one or more machine-readable medium having instructions stored thereon that, when executed by one or more processors, the instructions cause the one or more processors to perform the following steps: generating a first virtual skill region in response to a first touch operation on a virtual skill button on a user interface; identifying a plurality of virtual characters in the current view field and survival coefficients of the plurality of virtual characters; dividing the first virtual skill region into a plurality of sub-regions corresponding to each of the virtual characters based on the virtual characters and the survival coefficients; and in response to a selection operation on the plurality of sub-regions, determining the sub-regions corresponding to the selection operation as a target area; and identifying the virtual character corresponding to the target area as a target character, and locking the target character.

It should be understood that, the above general description and the following detailed description are merely illustrative and explanatory and cannot be construed as a limit to the present disclosure.

BRIEF DESCRIPTION OF THE DRAWINGS

The accompanying drawings, which are incorporated in and constitute a part of the description, illustrates embodiments in consistent with the present disclosure, and are used to explain the principles of the present disclosure along in connection with the description. Obviously, the drawings in the following description are merely some of the embodiments of the present disclosure, and one of ordinary skill in the art can obtain other drawings based on the drawings without any creative work. In the drawings.

DETAILED DESCRIPTION

In order to make the above described purpose, features, and advantages of the present disclosure more apparent, the present disclosure will be described in details in connection with the figures and the specific embodiments.

Figure 1:
FIG. 1 is a schematic view showing a current view field of a player looking for a target character in the prior art.
Figure 2:
FIG. 2 is a schematic diagram showing an effect diagram of a player chasing a virtual character by a long-distance sliding operation of a finger and changing a current view field in the prior art.

In an existing shooting game or a MOBA shooting game, it is frequently necessary to aim the target with a crosshair and then release the skill to the target. However, the character in the battle is generally in a moving state. When the player releases a skill, the skill may be released in vain because the skill release direction is not aiming the target, in addition, referring to FIG. 1 and FIG. 2, in the process of aiming the target character, in order to chase the character that is moving fast, the player needs to press the skill icon to drag the view angle to perform fast dragging for a long distance. FIG. 2 is the view field of the player after sliding operation in FIG. 1. The operation of fasting drag for a long distance operation makes the operation more difficult.

Figure 3:
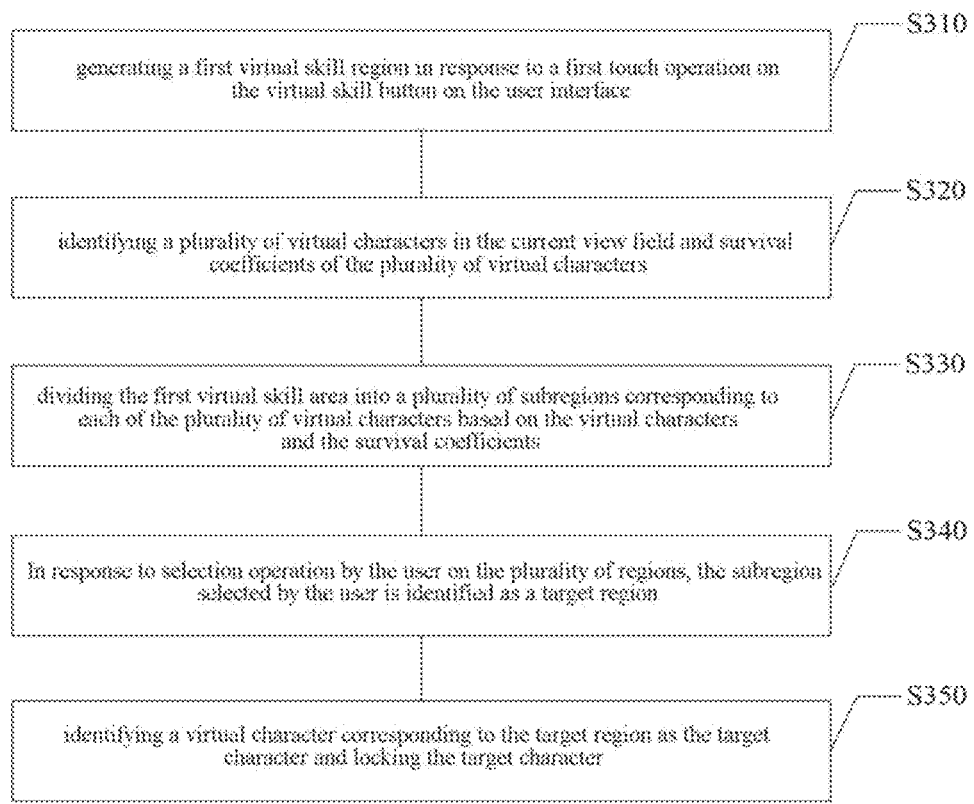
FIG. 3 schematically illustrates a flowchart of a virtual character processing method according to an exemplary embodiment of the present disclosure.

Based on this, in the present exemplary embodiment, a virtual character processing method is first provided, and the virtual character processing method according to the present disclosure can be implemented through a terminal device, wherein the terminal device can be, for example, a mobile phone, a computer, or various touchable electronic devices such as a personal digital assistant (PDA). And the virtual character processing method according to the embodiments of the present disclosure can also be implemented through a server. The embodiment of the present disclosure can be used to control the action of locking a target virtual character in a game scene. Referring to FIG. 3, the virtual character processing method can comprise the following steps:

Step 310: generating a first virtual skill region in response to a first touch operation on the virtual skill button on the user interface.

Figure 4:
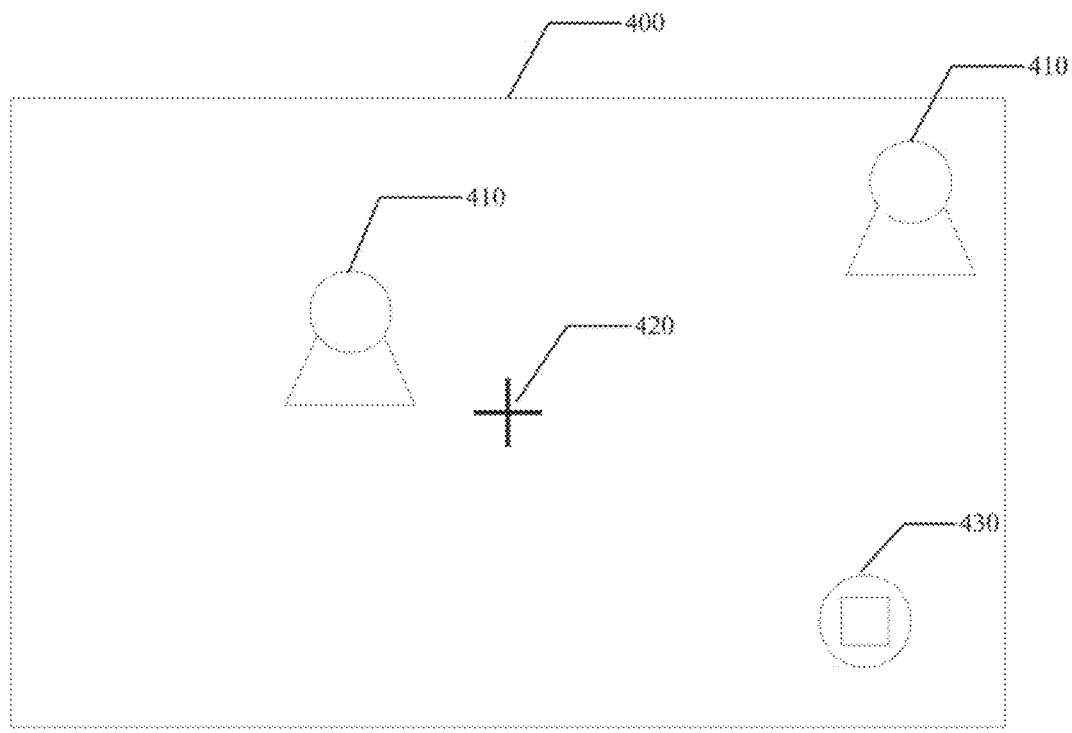
FIG. 4 schematically illustrates a view field in case of no touching by the player according to an exemplary embodiment of the present disclosure.

In some exemplary embodiments of the present disclosure, referring to FIG. 4, the user interface can be a game operating interface displayed on the screen of the terminal device. For example, the game may be various types of MOBA games, various shooting games, etc., and the user interface can present a current view field 400 of the user (i.e., the player), there may be a plurality of virtual characters 410, a first sighting scope model (i.e., a crosshair) 420, and a virtual skill button 430 in the current view field 400, wherein a position of the crosshair 420 will not be changed is throughout the game. And the virtual characters 410 may be a friend character or an enemy character with respect to the player. In the game, when the virtual character 410 is in a team different from the player, the virtual character 410 is an enemy character of the player; when the virtual character 410 is the same team as the player, the virtual character 410 is a friend character of the player.

Figure 5:
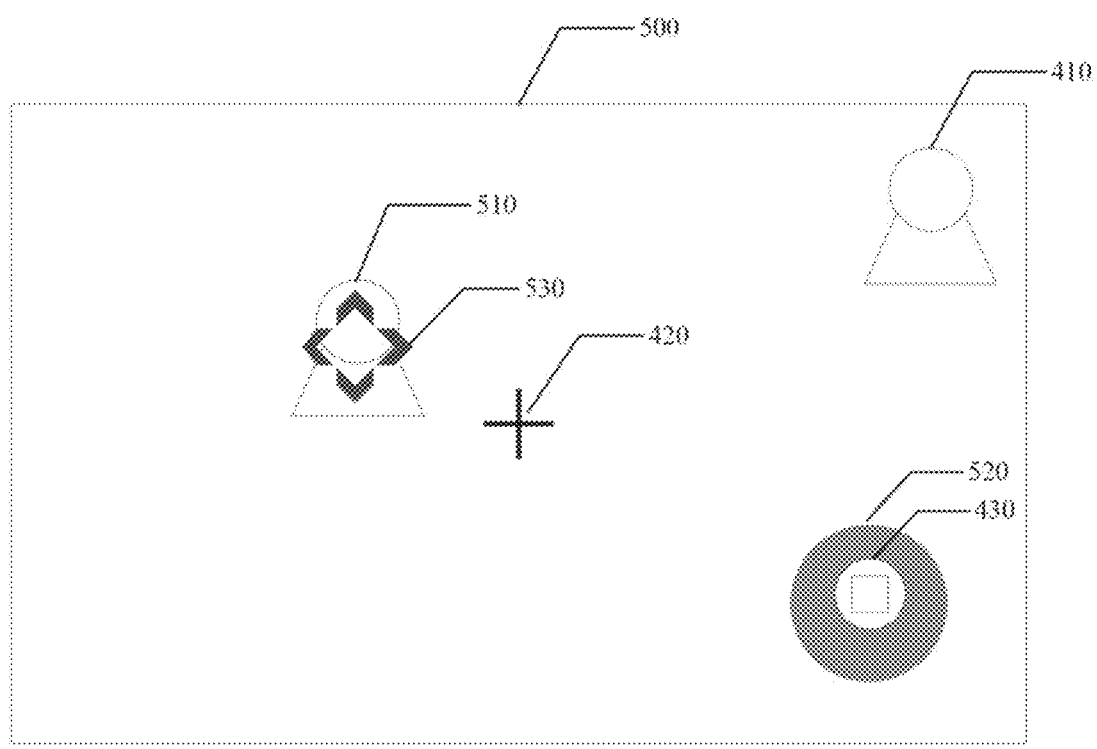
FIG. 5 schematically illustrates a view field after the player touching a virtual skill button according to an exemplary embodiment of the present disclosure.

In some exemplary embodiments of the present disclosure, the display state of the user interface is the state of the current view field 400 if no touch operation on the user interface. If the player touches the virtual skill button 430, a first touch operation of the user will be generated, wherein the first touch operation may be a clicking operation, a long pressing operation, or a sliding operation. The player can release a corresponding skill to a virtual character through the virtual skill button. Referring to FIG. 5, when the player touches the virtual skill button 430, the terminal device responds to the first touch operation on the virtual skill button 430 on the user interface, the view field of the player is changed from a view field 400 to a view field 500, and the view field 500 presents that a first virtual skill region 520 can be generated on a virtual skill button 430 in response to a first touch operation on the virtual skill button 430, wherein the first virtual skill region 520 is a gray circular region superimposed under the virtual skill button 430.

According to some exemplary embodiments of the present disclosure, after response to the first touch operation on the virtual skill button on the user interface, it is identified that the virtual character closest to the center of the view field is a target character. Referring to FIG. 5, when the first virtual skill region 520 is generated in response to the touch operation of the player, the distances from the plurality of virtual characters to the crosshair 420 are compared. At this time, the closest virtual character to the alignment 420 is the virtual character 510, and thus the virtual character 510 is automatically selected, that is, the terminal device will identify the virtual character 510 as a target character.

According to another exemplary embodiment of the present disclosure, the second sighting scope model is generated on the first sighting scope model, and the virtual character aimed by the second sighting scope model is the target character. The second sighting scope model can be an indicator locking the target character. Referring to FIG. 4 and FIG. 5, when the user performs the first touch operation, the first virtual skill region is generated on the virtual skill button. At this time, the second virtual sighting scope model appears, and the second sighting scope model can be a diamond icon 530. The virtual character locked by the diamond icon 530 is the target character, and after the target character is designated, it can be determined to release a corresponding skill to the target character. In addition, the virtual character locked by the second sighting scope model can be changed by the player's selection operation on the subregion, and the selection operation can be a sliding operation continuous with the first touch operation. That is, in response to the first touch operation on the virtual skill button on the user interface, it is determined that the virtual character closest to the first sighting scope model in the view field region is the target character, and a second sighting scope model is generated on the target character; in response to a sliding operation continuous to the touch operation, a position of the second sighting scope is changed according to the sliding direction of the sliding operation, so as to lock other virtual character as the target character.

According to still another exemplary embodiment of the present disclosure, in response to a selection operation on the plurality of subregions by the user, a position of the second sighting scope model is determined according to the selection operation, and a target character is determined according to the position of the second sighting scope model. After the second sighting scope model locking the target character, a diamond icon can be formed on the target character, such as the diamond icon 530 in FIG. 5, and the position of the second sighing scope model is located on the position of the target character, and thus, the target character can be determined.

According to still another exemplary embodiment of the present disclosure, aiming direction of the first sighting scope model is adjusted according to a second touch operation on a preset region on the user interface. The preset region can be any blank area on the user interface, and the second touch operation can be a sliding operation by the player in the preset region, and the aiming direction is controlled by performing a second touch operation in the blank area, that is, the presentation of the game scene is adjusted. During the game, the virtual character may be in a state of continuous moving, so the player can adjust the aiming direction of the crosshair through sliding operations in the preset region. For example, if the player performs a sliding operation to the right, the view field region will be moved along the direction in which the finger slides, and the position of the crosshair is at the center of the view field.

Step 320: identifying a plurality of virtual characters in the current view field and survival coefficients of the plurality of virtual characters.

Figure 6:
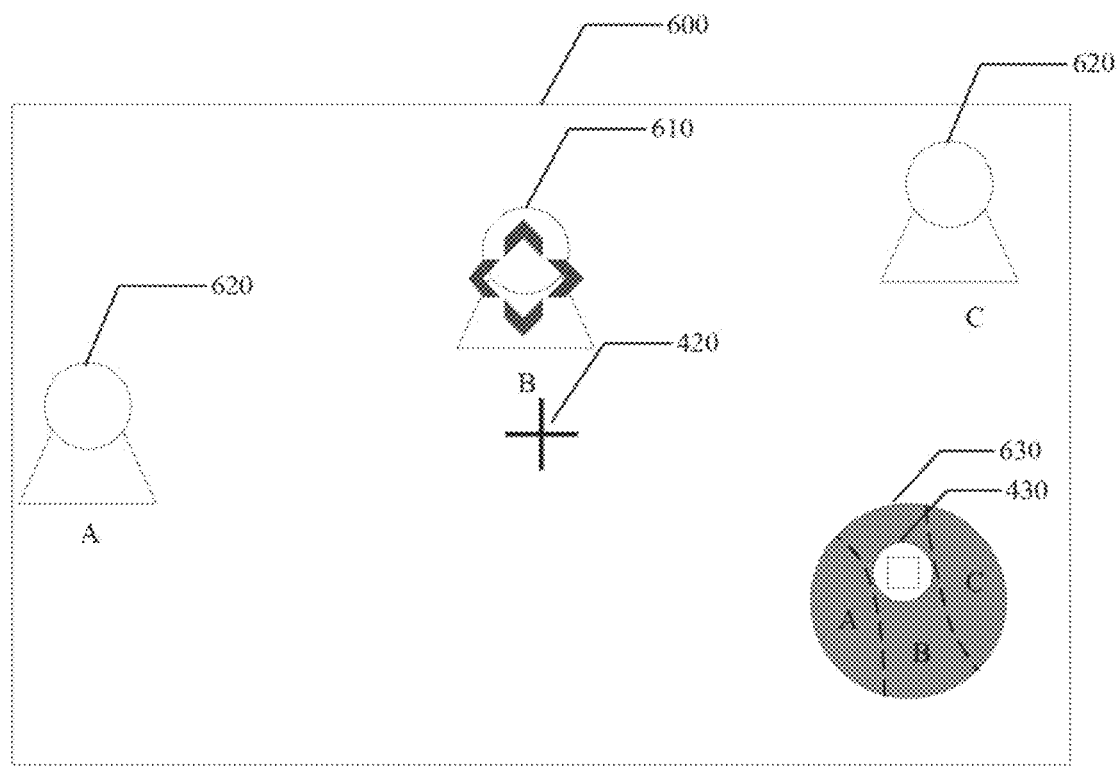
FIG. 6 schematically illustrates a first dividing manner for dividing subregions according to a plurality of virtual characters in the view field of the player according to an exemplary embodiment of the present disclosure.

In some exemplary embodiments of the present disclosure, there may be a plurality of virtual characters in the current view field. Referring to FIG. 6, for example, there may be three virtual characters in the current view field 600: virtual character A, virtual character B, virtual character C. In the view field 600, the virtual character A is in the left part of the current view field, the virtual character B is in the middle part of the current view field of, the virtual character C is in the right part of the current view field, and the virtual character B is closest to the center of gravity 420. The virtual character 610 that is selected is a virtual character B, and the virtual characters 620 that are not selected are a virtual character A and a virtual character C. Based on the plurality of virtual characters in the current view field 600, the number of virtual characters in the current view area can be counted first. At this time, there are three virtual characters in the current view field 600.

In addition, the survival coefficient of each virtual character is determined, and the survival coefficient of each virtual character is initialized to the same value in the game. During the game progresses, as the virtual character undergoes attacking, and gradual restoring after attacking, and etc., the coefficient of survival changes continuously.

Further, if there are other numbers of virtual characters in the current view field, for example, 2, 4 virtual characters, etc., the first virtual skill region is divided into the same number of subregions as the number of virtual characters, relative positions of respective subregions corresponding to respective virtual characters in the first virtual skill region are same as the relative positions of respective virtual characters in the current view field, and area of each subregion is the same.

Step 330: dividing the first virtual skill area into a plurality of subregions corresponding to each of the plurality of virtual characters based on the virtual characters and the survival coefficients.

In some exemplary embodiments of the present disclosure, referring to FIG. 6, there are three virtual characters in the current view field 600: virtual character A, virtual character B, virtual character C, and the game is in a state just completed initialization and not started yet, each of the virtual character has the same survival coefficient, and thus, the first virtual skill region 630 is divided into three subregions having the same area: subregion A, subregion B, and subregion C. In the game, the survival coefficient of a virtual character can be calculated based on the blood volume of the virtual character, and the initial blood volume of each virtual character can be set to 100%. As the game progresses, the blood volume of the virtual character changes, the blood volume of the virtual character can be reduced, and minimal blood volume of the virtual character can be 0%, and if so, the virtual character will be eliminated; if the blood volume of the virtual character is reduced and less than 100%, the blood volume can be restored by self-healing or healing by friendly character, and the blood volume can be restored to 100% at most. After identifying the survival coefficient of each virtual character, the virtual character with the least blood volume among the virtual characters displayed in the current view field can be taken as a reference character, and calculating proportions of the respective subregion of one or more virtual characters in the first virtual skill region to the first virtual skill region, respectively, and dividing into a plurality subregions corresponding to each of the virtual characters according to the respective proportions, in a premise that relative positions of the plurality of subregions in the first virtual skill region is kept in consistent with relative positions of the plurality of virtual characters in the current view field.

Therefore, the first virtual skill area can be divided into three areas, and when dividing the first virtual skill region, relative positions and subregions corresponding to each virtual characters in the first virtual skill region are kept in consistent with relative positions of the virtual characters in the current view field. For example, if the first virtual skill region 630 is divided into three regions, the left part can be a subregion corresponding to the virtual character A, the middle part can be a subregion corresponding to the virtual character B, and the right part can be a subregion corresponding to the virtual character C.

According to some exemplary embodiments of the present disclosure, the survival coefficient of the virtual character can be represented by a blood volume value of the virtual character, and size of the sub-region corresponding to the virtual character is determined based on the blood volume value of the virtual character. In the game, the blood volume value of the virtual character is set under a predefined rule. For example, the upper limit of the blood volume value for a warrior can be set to 120, and the upper limit of the blood volume value for a shooter and the mage is 90, 90, respectively. During the game, size of the subregion of corresponding to a virtual character is determined according to the real-time blood volume value of the virtual character.

According to another exemplary embodiment of the present disclosure, if the survival coefficients of the plurality of virtual characters are the same, the first virtual skill region is divided into a plurality of subregions having the same area with the amount same as the plurality of virtual characters. Referring to FIG. 6, there are three virtual characters in the current view field 600: virtual character A, virtual character B, virtual character C, and the blood volumes of the virtual character A, the virtual character B, and the virtual character C each is 100%, that is, the virtual characters have the same survival coefficients, and then, weights for operating the three virtual characters have the same weights in the first virtual skill region. And thus, the first virtual skill region 630 is divided into three subregions having the same area: subregion A, subregion B, and subregion C.

Figure 7:
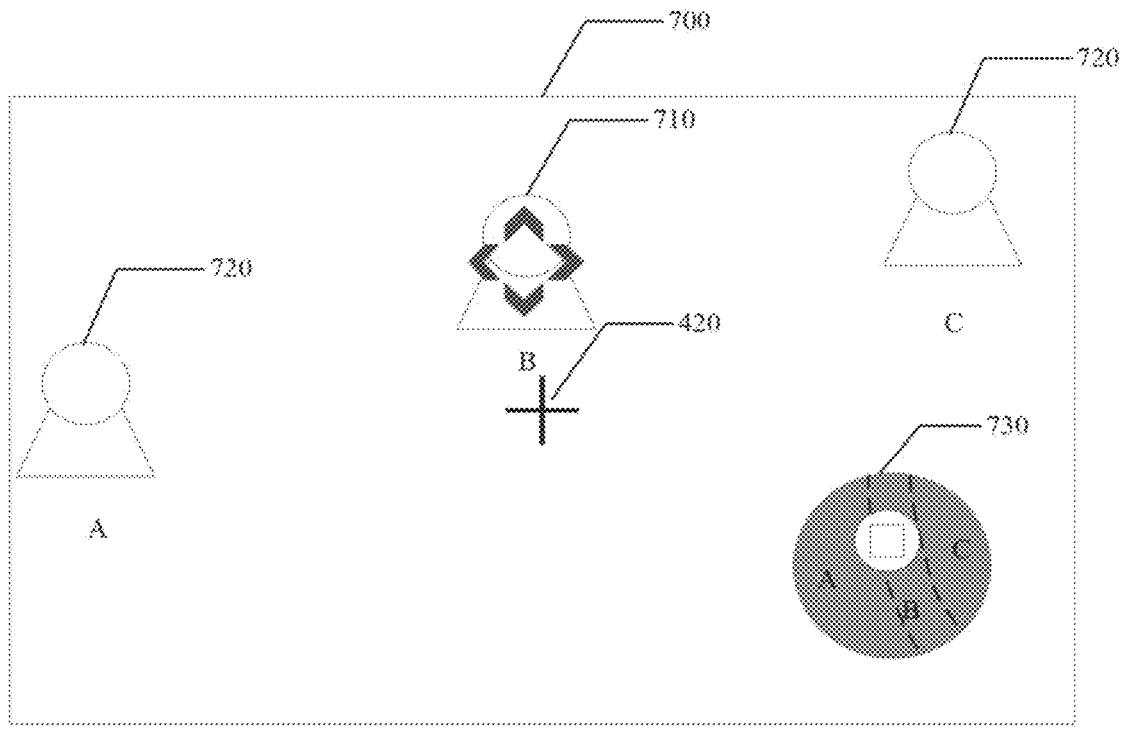
FIG. 7 schematically illustrates a second dividing manner for dividing subregions according to a plurality of virtual characters in the view field of the player according to an exemplary embodiment of the present disclosure.

According to another exemplary embodiment of the present disclosure, if the survival coefficients of the plurality of virtual characters are different, the first virtual skill region is divided into a plurality of subregions with the same number as the number of the virtual characters and having different areas. As the game progresses, the blood volume of the virtual characters will be changed. Referring to FIG. 7, there are three virtual characters in the view field 700: virtual character A, virtual character B, and virtual character C, and the blood volumes of the virtual character A, the virtual character B, and the virtual character C are 50%, 100%, and 100%, respectively. As the blood volume of the virtual character is less than that of the virtual character B and the virtual character C, weight for operating the virtual character A can be greater than weights for operating the virtual character B and the virtual character C. and thus, area of the divided subregion A will be increased in the first virtual skill region, the result of dividing the first virtual skill region is illustrated in 730 of FIG. 7. The virtual character B is closest to the crosshair 420. Therefore, the selected virtual character 710 is the virtual character B, and the unselected virtual character 720 is the virtual character A and the virtual character C. And next, the locked target character is switched from the virtual character B the virtual character A by operation such as a finger sliding or the like.

Figure 8:
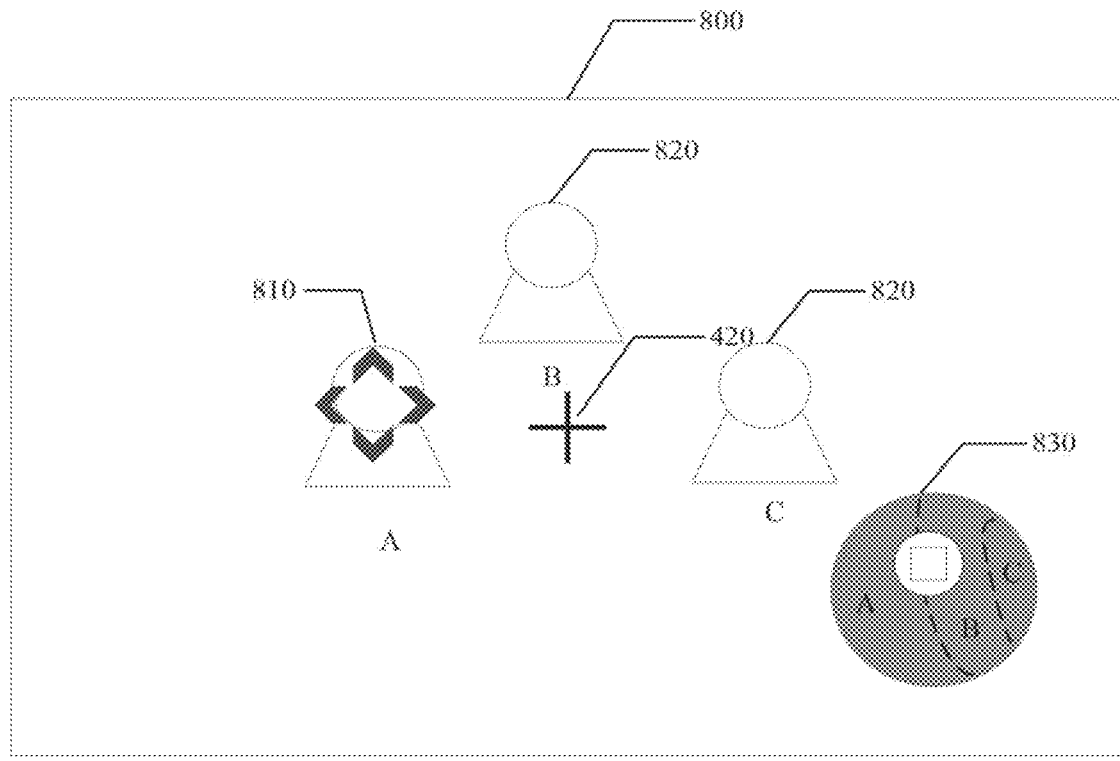
FIG. 8 schematically illustrates a view of locking target character when a plurality of virtual characters which have same distance from the crosshair appear in the view field of the player according to an exemplary embodiment of the present disclosure.

In addition, when the plurality of virtual characters in the current view field have the same distance to the center of the center, the virtual character with the least blood volume can be automatically locked as the target character. Referring FIG. 8, there are three virtual characters in the view field 800: character A, virtual character B, and virtual character C, and the three virtual characters have same distance to the crosshair 420. The blood volume of the character A, the virtual character B, and the virtual character C are 50%, 75%, and 100%, respectively, and the blood volume of the virtual character A is the least and the virtual character A is automatically selected. Thus, the virtual character 810 that is selected is the virtual character A, and the virtual characters 820 that are not selected are the virtual character B and the virtual character C. In addition, the weight of the virtual character A with respect to the virtual character B and the virtual character C becomes greater, and area of the subregion corresponding to the virtual character A in the first virtual skill region 830 increases.

Of course, it is easily understood by one of ordinary skill in the art that there are other numbers of virtual characters in the current view field, and dividing the first virtual skill region into subregions also follows the dividing method as described above, and dividing the first virtual skill region into various subregions falls into the scope of the present disclosure, and is not particularly limited in the exemplary embodiment.

Step 340: In response to selection operation on the plurality of regions, the subregion corresponding to the selection operation is identified as a target region.

Figure 9:
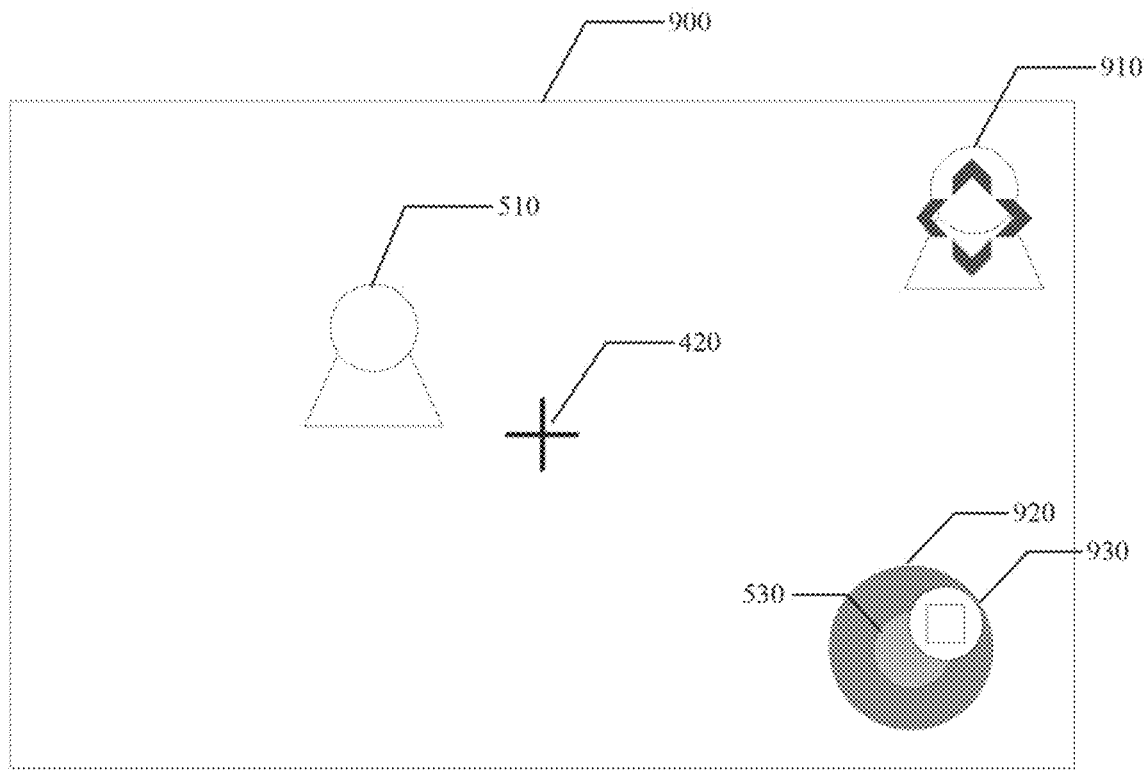
FIG. 9 schematically illustrates a result of changing a locked character through sliding operation by the player according to an exemplary embodiment of the present disclosure.

In some exemplary embodiments of the present disclosure, selection operation by the player on the plurality of subregions can be a sliding operation, and the player can select subregions by sliding operation of the finger in respective subregions within the first virtual skill region. If the player's finger slides to a certain sub-area in the first virtual skill region, the virtual character in the corresponding current view field is selected. Comparing FIG. 5 and FIG. 9, before the sliding operation, a state of the first virtual skill region in the view field 500 is the display state of the first virtual skill region 520, and after the sliding operation, the current view field is changed from the view field 500 to the view field 900. At this time, the virtual skill button moves according to the movement of the touch point of the sliding operation. As illustrated in FIG. 9, the state in the first virtual skill region 920 is changed from a virtual skill button 530 to a virtual skill button 930, and relative position of the virtual skill button 930 in the first virtual skill region 920 is the upper right corner. Therefore, the locked target character in the view field 900 is changed from the virtual character 510 at the left to the virtual character 910 in the upper right position, with the sliding operation. In other embodiments, the virtual skill button can further be set to move along with movement of the touch point of the sliding operation.

According to some exemplary embodiments of the present disclosure, if the target character moves to outside of the current view field, the view field is controlled to move to a direction in which the target character moves. In actual combat games, the virtual character may be in a continuously moving state. After locking the virtual character as a target character, if the target character is continuously moving, the device automatically controls view field of the player to move toward the direction in which the target character moves. For example, if the target character moves to the right of view field of the current player, the view field of the player will automatically move to the right along with the moving direction of the target character.

According to another exemplary embodiment of the present disclosure, after locking the target character through the second touch operation by the player and before switching the target character, the target character may not require the player to perform any operation during the moving process, and the view field of the player can automatically refresh along with the moving direction of the target character, and current view field can be continuously formed and updated.

According to another exemplary embodiment of the present disclosure, the second sighting scope model locking the target character makes the player continuously focusing on the moving direction of the target during the game. If the locked target character moves out of the current view field, the player can control the virtual rocker through the sliding operation of the finger so as to chase the virtual character and make the virtual character back to the current view field.

Figure 10:
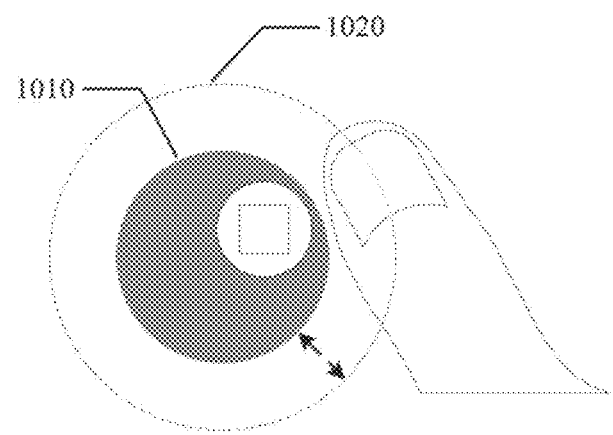
FIG. 10 schematically illustrates a result of changing virtual skill region of the current view field through sliding operation by the finger of the player according to an exemplary embodiment of the present disclosure.
Figure 11:
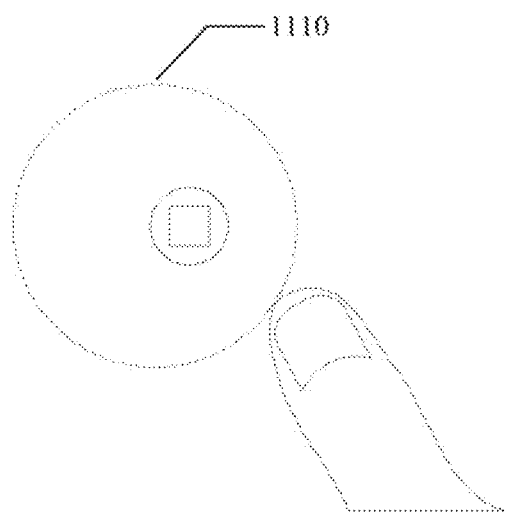
FIG. 11 illustrates a schematic view of result of changing virtual skill region of the current view field through sliding out by the finger of the player according to an exemplary embodiment of the present disclosure.

According to some exemplary embodiments of the present disclosure, after a player's finger touches the first virtual skill button, a second virtual skill region is immediately adjacent to the generated first virtual skill region. Referring to FIG. 10, the first virtual skill region 1010 is immediately adjacent to the second virtual skill area 1020. If the touch operation is located within the first virtual skill region 1010, the current field of view area will not change. Compared with FIGS. 5 and 9, the touch operation by the player occurs in the first virtual skill region, so the scopes of the view fields in FIGS. 5 and 9 are the same, except that the state of some virtual characters in the view field, the position of the virtual skill button and a state of the first virtual skill region changed slightly.

According to another exemplary embodiment of the present disclosure, if the touch operation is located outside the first virtual skill region and within the second virtual skill region, the view field moves with the direction in which the touch operation moves. Referring to FIG. 10, if the touch operation by the finger of the player is located outside the first virtual skill region and within the second virtual skill region, the view field moves with the direction in which the touch operation moves. For example, if the direction in which the finger slides in the annular region is the upper right direction, the view field will be continuously updated as the finger slides in the upper right direction. When the player's finger returns to the first virtual skill region 1010, the view field of the player stops moving, and the view field of the player is the instantaneous view field of the player when the player's finger enters the first virtual skill region 1020.

Figure 12:
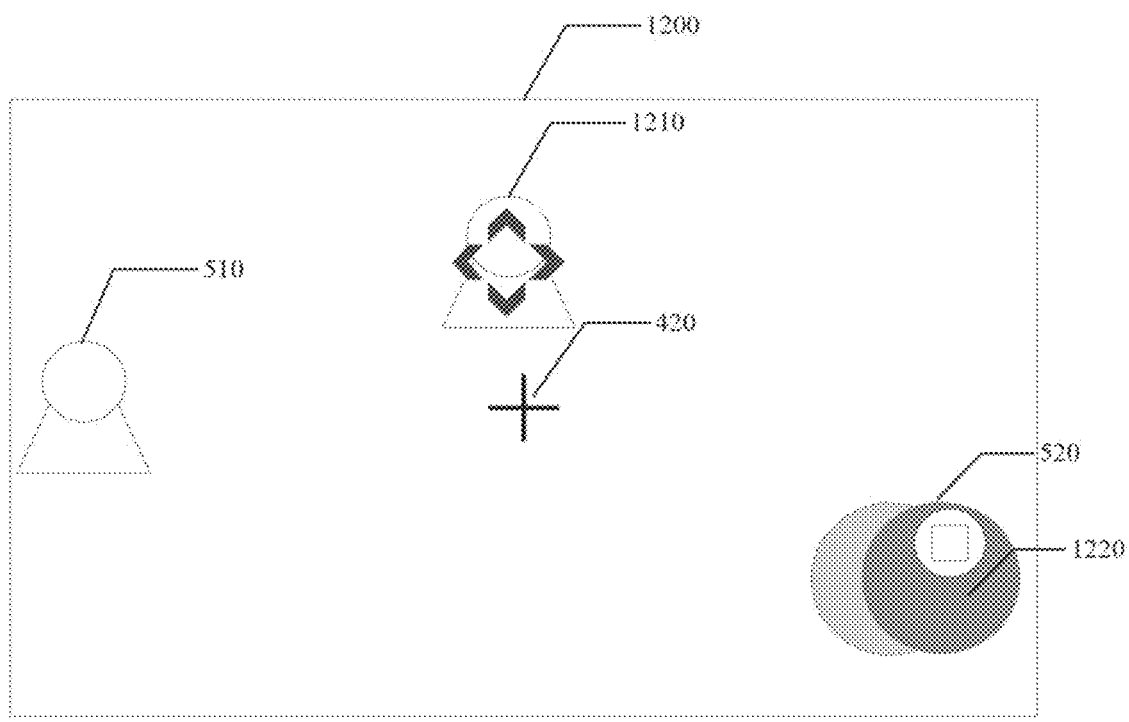
FIG. 12 schematically illustrates a view of changing currently locked target through sliding operation by the player and a view field after changing the current view field according to an exemplary embodiment of the present disclosure.

According to some exemplary embodiments of the present disclosure, when the touch operation returns to the first virtual skill region from the second virtual skill region, position where the first virtual skill region is controlled changes so that the relative position of a new target character in the view field of view coincides with a relative position of the virtual skill button in the first virtual skill region. Referring to FIGS. 5 and 12 in a comparison manner, after the player's sliding operation is completed, the player's finger returns to the first virtual skill region, and the view field of the player is changed from the view field 500 to the view field 1200 due to the sliding operation of the player's finger. And at this time, the locked target character is changed from the virtual character 510 to a virtual character 1210. After the sliding operation is completed, the position of the virtual skill button will not change, but the relative position of the virtual skill button in the first virtual skill region will be the same as the relative position of the locked virtual character in the current view field. Therefore, the position of the first virtual skill region will be changed from the first virtual skill region 520 to the first virtual skill region 1220. At this time, the relative position of the selected virtual character 1210 in the view field is directly above, so the relative position of the virtual skill button in the first virtual skill area 1220 is also directly above.

Step 350: identifying a virtual character corresponding to the target region as the target character and locking the target character.

In some exemplary embodiments of the present disclosure, after the touch operation by the player, if the finger is in a subregion of the first virtual skill region, and the finger does not move any more, a subregion in which the finger is located can be determined as a target region, and a virtual character in a view field corresponding to the target region is determined as a target character. And at this time, the target character is locked. The player can perform a skill release operation on the target character, so as to release a corresponding skill to the target character.

In some of the present exemplary embodiments, the skill can be released to the target character at the end of detecting the first touch operation. The performance in the game is as follows: according to a selection operation by the finger of a user on a plurality of subregions in the first virtual skill region, taking the subregion selected by the user as a target region, wherein the selection operation can be a sliding operation; determining a virtual character corresponding to the target region as a target character and locking the target character; after locking the target character is locked, controlling a corresponding skill to be released on the target character when detecting the operation point of the sliding operation to leave the user interface.

In this exemplary embodiment, when it is detected that operation point of the first touch operation is located in a preset region, or the distance between the operation point of the first touch operation and the first virtual skill area is greater than a preset value, release of the skill is cancelled. For example, a skill cancel control is provided on the user interface, when it is detected that operation point of the first touch operation is located in the skill cancel control, release of the skill will be cancelled, for example, if the player clicks the skill cancel control, the release of the skill will be cancelled; or, if the touch point of the touch operation outside of the first virtual skill region is detected and a distance from the touch point to the virtual skill region is greater than a preset value, if the finger of the player leaves the user interface, it is considered that the release of the skill is cancelled.

When the player releases skills, a specific skill can be released based on identification of the virtual character as a friend or an enemy. If the target character is an enemy, a negative skill will be released to the target character; and if the target character is a friend, a positive skill will be released to the target character. The negative skill can be, for example, shooting bullets, bows and arrows, throwing grenades, firing mortars, etc. to an enemy character, or hitting the target character of enemy with corresponding tools to reduce the blood volume of the target character. The positive skill can be, for example, to rescue a friendly character and send corresponding items such as energy bags, first aid needles, life-saving bags and the like to the friendly character to increase blood volume.

Of course, one of ordinary skill in the art can easily understand that the positive skill applied to a friendly character or the negative skill applied to an enemy character are all skills released for the survival of the player side. The specific form of skills released is not specifically limited in the present disclosure, and changes in skill release are all within the protection scope of the present disclosure.

In the embodiment of the present disclosure, on one hand, in response to the first touch operation on the virtual skill button on the user interface, the virtual character closest to the crosshair can be automatically locked as the target character. After locking the target character, if the target character continues to move, the current view field will change correspondingly along with the moving direction of the target character, thus reducing difficulty for the player to lock the target character and reducing the sliding distance of the players fingers. And on the other hand, the locked target character can be switched through a sliding operation by the finger of the user, thereby achieving fast switching of the target character. And further, if the finger of the player is released beyond a certain virtual skill region, the release of skill can be cancelled, thereby preventing wrong operation of skill release in a case of target character unidentified and reducing times of skill cool down.

Figure 13:
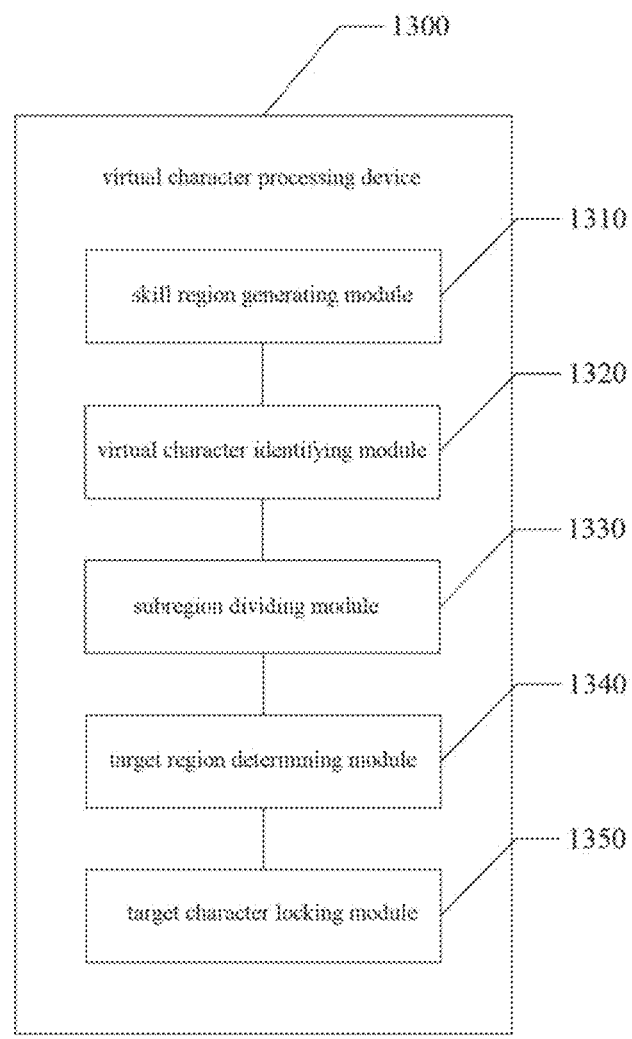
FIG. 13 schematically illustrates a block diagram of a virtual character processing device according to some exemplary embodiments of the present disclosure.

In addition, in an exemplary embodiment of the present disclosure, a virtual character processing device is further provided. Referring to FIG. 13, the virtual character processing device 1300 comprises a skill region generating module 1310, a virtual character identifying module 1320, a subregion dividing module 1330, a target region determining module 1340, and a target character locking module 1350.

More specifically, the skill region generating module 1310 can generate a first virtual skill region in response to the first touch operation on the virtual skill button on the user interface; the virtual character identifying module 1320 can identify a plurality of virtual characters in the current view field region and a survival coefficient of the plurality of virtual characters; the subregion dividing module can divide the first virtual skill region into a plurality of sub-regions corresponding to the respective virtual characters based on the virtual characters and the survival coefficient; the target region determining module 1340 can determine subregions corresponding to a selection operation as a target region in response to the selection operation on a plurality of subregions; and the target character locking module can identify a virtual character corresponding to the target region as a target character, and lock the target character.

The virtual character processing device 1300 can generate a first virtual skill region in response to a touch operation on a virtual skill button by the player, select a corresponding virtual character through selection by the player on a corresponding subregion in the first virtual skill region, wherein the selection by the player can be completed through a sliding operation, and the player can change the locked character through sliding operation on a corresponding virtual skill region, and at the same time, the current view field region can be updated correspondingly along with a direction of the sliding operation of the player.

Figure 14:
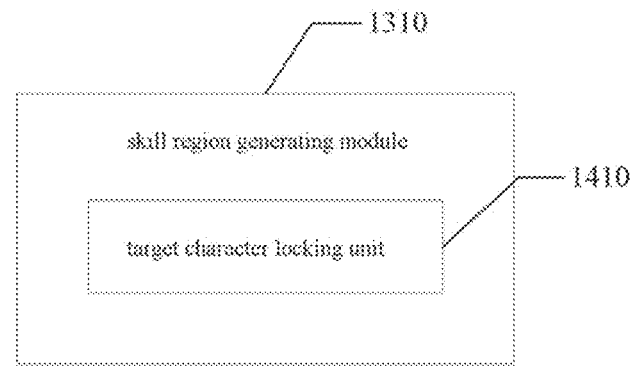
FIG. 14 schematically illustrates a block diagram of a skill region generation module according to a first exemplary embodiment of the present disclosure.

According to an exemplary embodiment of the present disclosure, referring to FIG. 14, the skill region generating module 1310 can comprise a skill region generating unit 1410.

More particularly, the target character locking unit 1410 can be configured to generate a first virtual skill region in response to a first touch operation on the virtual skill button on the user interface.

The target character locking unit 1410 can generate a first virtual skill region in response to a first touch operation by the user, and the user can change the view field through a sliding operation on the first virtual skill region.

Figure 15:
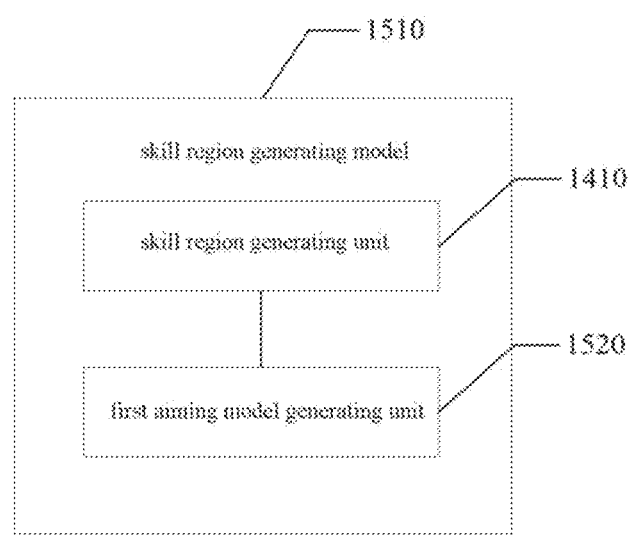
FIG. 15 schematically illustrates a block diagram of a skill region generation module according to a second exemplary embodiment of the present disclosure.

According to some exemplary embodiments of the present disclosure, referring to FIG. 15, in addition to the skill region generating unit 1410, the skill region generating model 1510 can further comprise a first aiming model generating unit 1520.

More particularly, the first aiming model generating unit 1520 can be configured to provide a sighting scope model and adjust an aiming direction corresponding to the first sighting scope model according to a second touch operation on a preset region on the user interface.

The first aiming model generating unit 1520 can facilitate the user to chase a virtual character by changing the aiming direction corresponding to the first sighting scope model through a sliding operation by taking the first aiming model as a reference.

Figure 16:
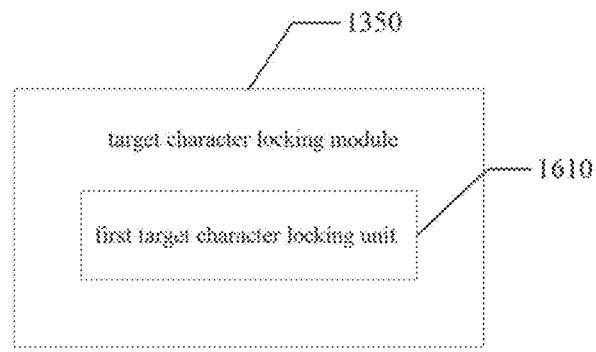
FIG. 16 schematically illustrates a first block diagram of a target character locking module according to some exemplary embodiments of the present disclosure.

According to another exemplary embodiment of the present disclosure, referring to FIG. 16, the target character locking module 1350 can further comprise a first target character locking unit 1610.

More particularly, the first target character locking unit 1610 can be configured to identify the closest virtual character to the first sighting scope model as a target character in response to the first touch operation on the virtual skill button on the user interface.

If there are a plurality of virtual characters in the current view field, The first target character locking unit 1610 can automatically lock a target character, thereby increasing the success rate of subsequent skill release.

Figure 17:
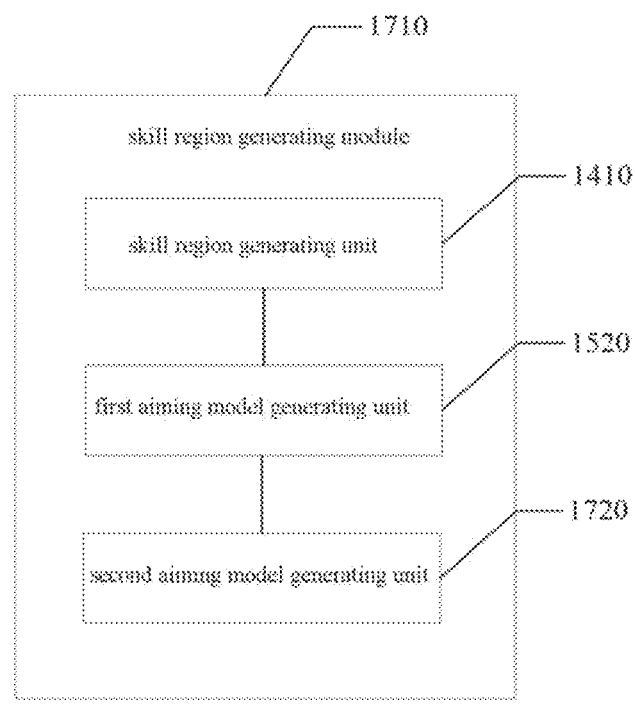
FIG. 17 schematically illustrates a block diagram of a skill region generation module according to a third exemplary embodiment of the present disclosure.

According to another exemplary embodiment of the present disclosure, referring to FIG. 17, in addition to the skill region generating unit 1410 and the first aiming model generating unit 1520, the skill region generating module 1710 can further comprise a second aiming model generating unit 1720.

More particularly, the second aiming model generating unit 1720 can be configured to generate a second sighting scope model on the first sighting scope model.

The second aiming model generating unit 1720 is configured to present the currently locked virtual character to the user, to facilitate the user to release a skill or lock other target character again.

Figure 18:
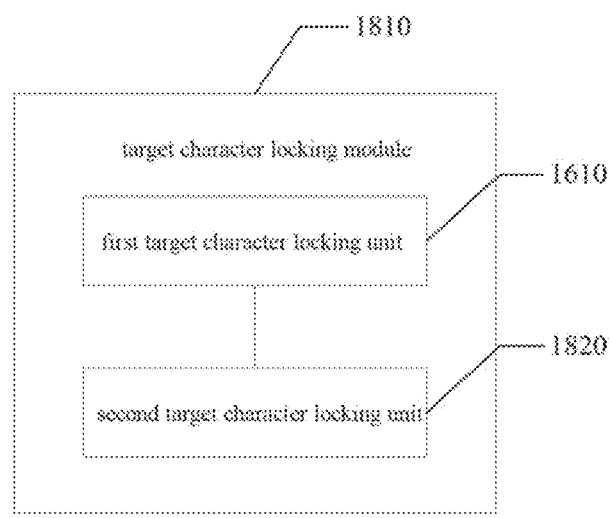
FIG. 18 schematically illustrates a second block diagram of a target character locking module according to some exemplary embodiments of the present disclosure.

According to still another exemplary embodiment of the present disclosure, referring to FIG. 18, in addition to the first target character locking unit 1610, the target character locking module 1810 can further comprise a second target character locking unit 1820.

More particularly, the second target character locking unit 1820 can be configured to determine a position of the second sighting scope model according to a selection operation in response to the selection operation on a plurality of subregions, and to identify a target character according to the position of the second sighting scope model.

The second target character locking unit 1820 can be configured to determine a position of the second sighting scope model according to a selection operation on the subregions and further to identify a target character.

Figure 19:
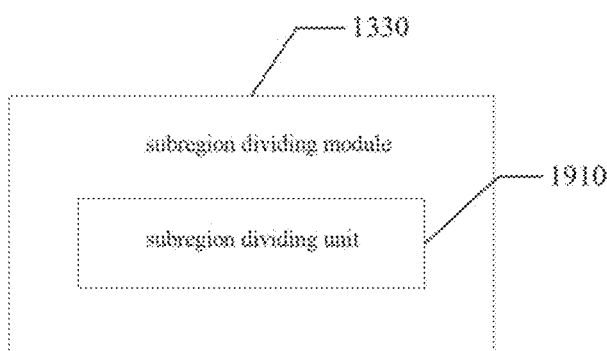
FIG. 19 schematically illustrates a block diagram of a subregion dividing module according to some exemplary embodiments of the present disclosure.

According to another exemplary embodiment of the present disclosure, referring to FIG. 19, the subregion dividing module 1330 can comprise a subregion dividing unit 1910.

More particularly, the subregion dividing unit 1910 can be configured to divide the first virtual skill region into a plurality of subregions with the same number as the virtual characters and having the same area if the survival coefficients of the plurality of virtual characters are the same, and to divide the first virtual skill region into a plurality of subregions with the same number as the number of the virtual characters and having different areas according to the survival coefficient if the survival coefficient of the plurality of virtual characters are different.

Figure 20:
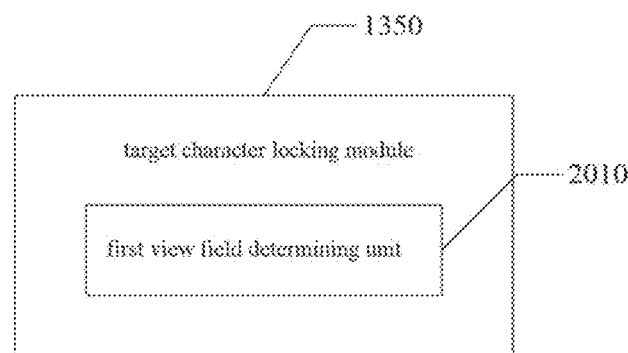
FIG. 20 schematically illustrates a block diagram of a target character locking module according to a first exemplary embodiments of the present disclosure.

According to some exemplary embodiments of the present disclosure, referring to FIG. 20, the target character locking module 1350 can further comprise a first view field determining unit 2010.

More particularly, the first view field determining unit 2010 is configured to control the view field to move toward a direction in which the target character moves if the target character moves to outside of the current view field.

When the target character is in a moving state, the first view field determining unit 2010 dynamically updates the player's view field along with the moving direction of the target character.

Figure 21:
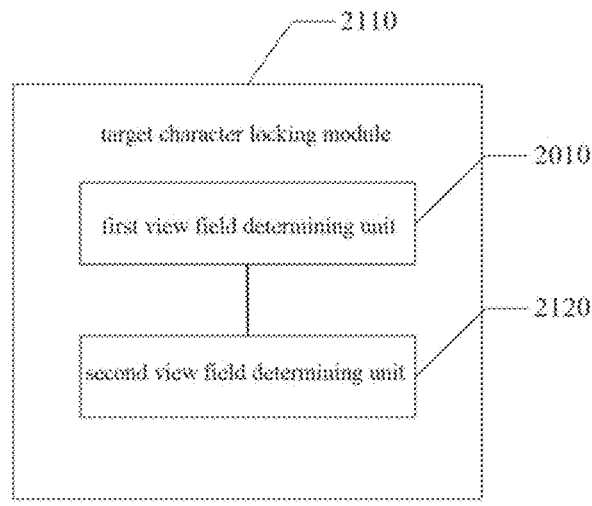
FIG. 21 schematically illustrates a block diagram of a target character locking module according to a second exemplary embodiments of the present disclosure.

According to another exemplary embodiment of the present disclosure, referring to FIG. 21, in addition to the first view field determining unit 2010, the target character locking module 2110 can further comprise a second view field determining unit 2120.

More particularly, a second virtual skill region is immediately adjacent to the first virtual skill region, and the second view field determining unit 2120 is configured to move the view field along a direction in which a touch operation moves if the touch operation is located outside of the first virtual skill region and within a second virtual skill region.

The second view field determining unit 2120 dynamically updates the player's view field along the sliding direction of the finger of the user in the virtual skill region.

Figure 22:
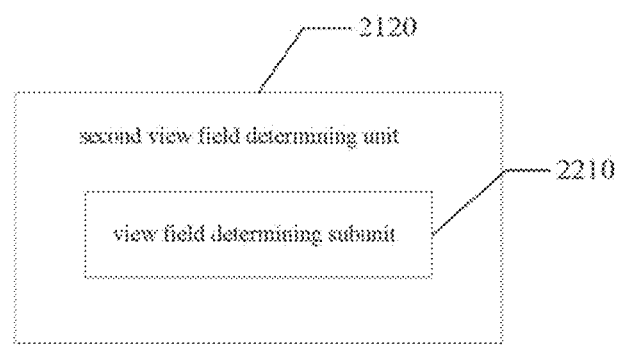
FIG. 22 schematically illustrates a block diagram of a second view field according to some exemplary embodiments of the present disclosure.

According to some exemplary embodiments of the present disclosure, referring to FIG. 22, the second view field determining unit 2120 can comprise a view field determining subunit 2210.

More particularly, when the touch operation returns to the first virtual skill region from the second virtual skill region, the view field determining subunit 2210 can be configured to change the position of the first virtual skill region, so as to make the relative position of a new target character in the view field in consistent with a relative position of the virtual skill button in the first virtual skill region.

Figure 23:
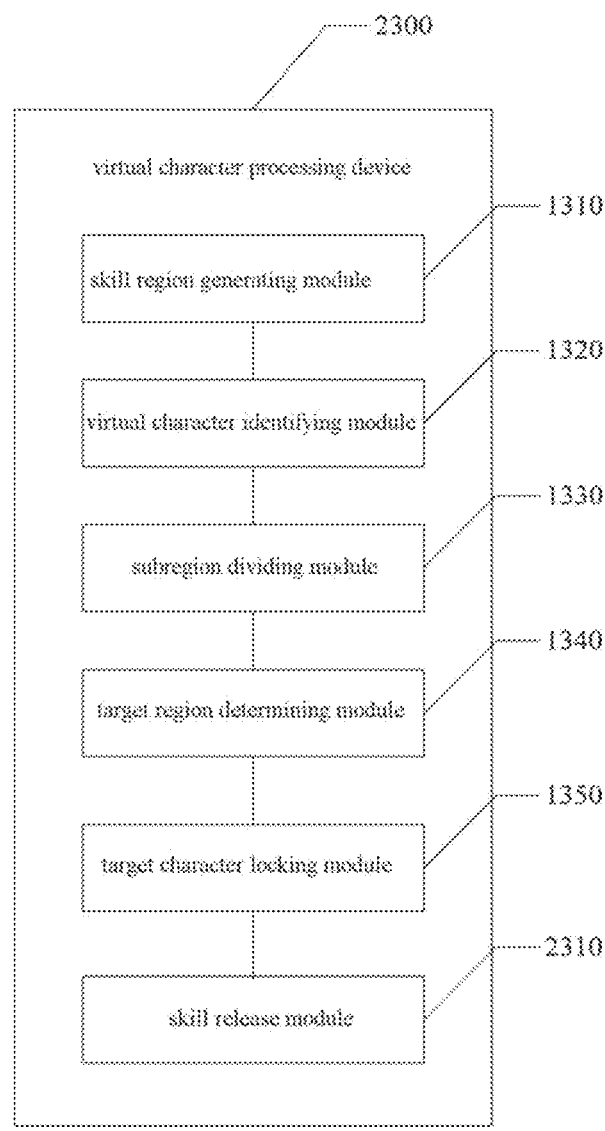
FIG. 23 schematically illustrates a block diagram of a virtual character processing device according to another exemplary embodiments of the present disclosure.

In another exemplary embodiment of the present disclosure, a virtual character processing device 2320 is further provided. Referring to FIG. 23, compared to the virtual character processing device 1300, the virtual character processing device 2300 can further comprises a skill release module 2310, in addition to the skill region generating module 1310, the virtual character identifying module 1320, a subregion dividing module 1330, a target region determining module 1340, and a target character locking module 1350.

Specifically, the skill release module 2310 can be configured to determine the region formed by the first virtual skill region and the second virtual skill area as the third virtual skill area; cancel release of the skill to the target character if touch operation outside the third virtual skill region is detected; and release the skill to the target character if touch operation in the third virtual skill region is detected.

The skill release module 2310 releases the skill to the target character upon the player triggering the skill release button and removing the finger from the skill release button. If the user wants to cancel the skill release, he can drag the finger to the third virtual skill region and release the finger to cancel the release skill.

The specific details of each module of the virtual character processing device has been described in the corresponding virtual character processing method, and will not be elaborated herein.

It should be noted that although several modules or units of the virtual character processing device has been mentioned in the foregoing description, such divisions are not mandatory. Indeed, in accordance with embodiments of the present disclosure, the features and functions of two or more modules or units described above can be embodied in one module or unit. On the contrary, the features and functions of one module or unit described above can be also be embodied in more module or units.

In addition, in an exemplary embodiment of the present disclosure, an electronic apparatus is further provided.

One of ordinary skill in the art will appreciate that various aspects of the present invention can be implemented as a system, a method, or program product. Accordingly, aspects of the present disclosure can be embodied in the following forms: a complete hardware embodiment, a complete software embodiment (comprising firmware, microcode, etc.), or an embodiment of combination of hardware and software, which can be collectively referred to as "circuit," "module," or "system" herein.

An electronic apparatus 2400 in accordance with an embodiment of the present invention will be described below with reference to FIG. 24. The electronic apparatus 2400 illustrated in FIG. 24 is merely an example and should not be construed as a limit to the function and application scope of the embodiments of the present disclosure.

Figure 24:
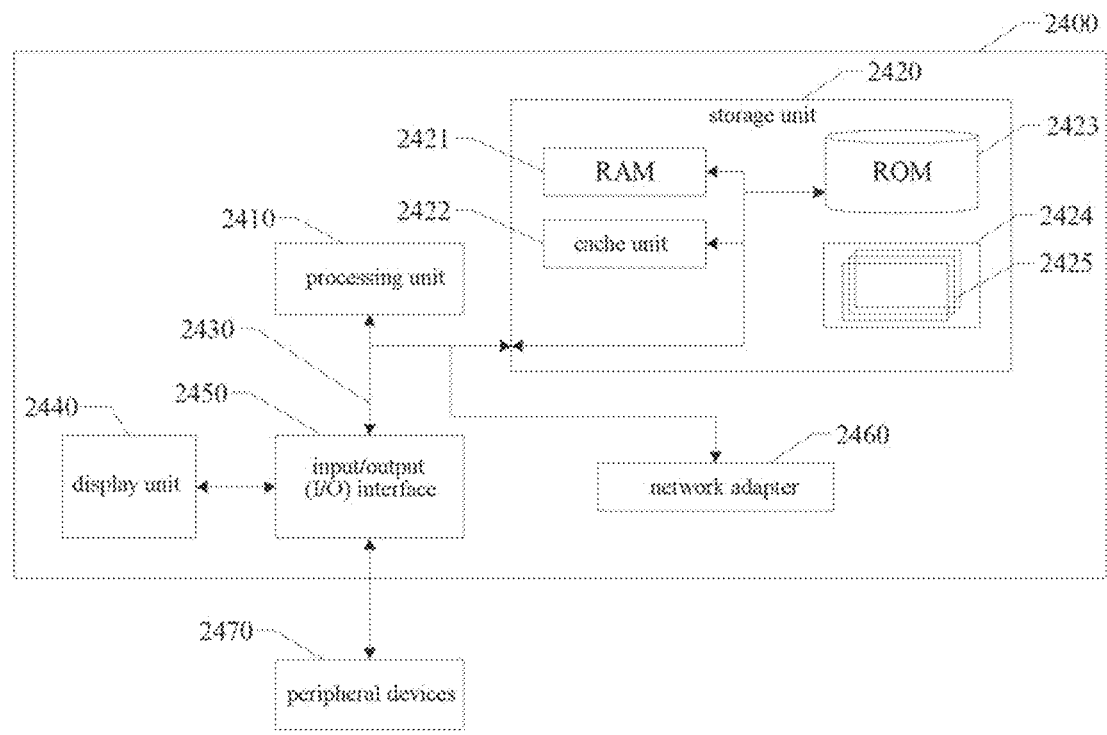
FIG. 24 schematically illustrates a block diagram of an electronic apparatus according to an exemplary embodiments of the present disclosure.

As illustrated in FIG. 24, electronic device 2400 is embodied in a form of a general purpose computing device. Components of the electronic apparatus 2400 can include, but are not limited to, the at least one processing unit 2410, the at least one storage unit 2420, a bus 2430 connecting the different system components (comprising the storage unit 2420 and the processing unit 2410), and a display unit 2440.

Wherein the storage unit stores program code, which can be executed by the processing unit 2410, and causes the processing unit 2410 to perform the steps according to the various exemplary embodiments of the present disclosure described in in the "Exemplary Method" section of the present specification.

The storage unit 2420 can comprise a readable medium in the form of a volatile storage unit, such as a random access memory (RAM) unit 2421 and/or a cache unit 2422, and can further comprise a read only memory (ROM) unit 2423.

The storage unit 2420 can also comprise a program/utility 2424 having a set (at least one) of the program modules 2425, such program modules 2425 comprising but not limited to: an operating system, one or more applications, other program modules, and program data, Implementations of the network environment can be comprised in each or some of these examples.

The bus 2430 can represent one or more of several types of bus structures, comprising a local bus in a memory unit bus or memory unit controller, a peripheral bus, an accelerated graphics port, a processing unit, or a local bus in any type bus structure using various bus structures.

The electronic device 2400 can further be in communication with one or more peripheral devices 2470 (e.g., a keyboard, a pointing device, a Bluetooth device, etc.), and can further be in communication with one or more devices that enable the user to interact with the electronic device 2400, and/or enable the electronic device 2400 to communicate with any device (e.g., router, modem, etc.) that is in communication with one or more other computing devices. This communication can be performed via an input/output (I/O) interface 2450. Also, the electronic apparatus 2400 can further communicate with one or more networks (eg, a local area network (LAN), a wide area network (WAN), and/or a public network, such as the Internet) through a network adapter 2460. As illustrated, the network adapter 2460 communicates with other modules of the electronic apparatus 2400 via the bus 2430. It should be understood that although not shown in the figures, other hardware and/or software modules may be utilized in conjunction with the electronic apparatus 2400, comprising but not limited to: microcode, device drivers, redundant processing units, external disk drive arrays. RAID systems, tape drives, data backup storage systems, and etc.

Through the above description of the embodiments, one of ordinary skill in the art can easily understand that the exemplary embodiments described herein can be implemented by software, or may be implemented by software in combination with necessary hardware. Therefore, the technical solution according to embodiments of the present disclosure can be embodied in the form of a software product. The software product can be stored in a non-volatile storage medium (which can be a CD-ROM, a USB flash drive, a mobile hard disk, etc.) or on a network, and can comprise a number of instructions which cause a computing device (which may be a personal computer, server, terminal device, or network device, etc.) to perform the methods in accordance with embodiments of the present disclosure.

In exemplary embodiments of the present disclosure, a computer-readable medium is further provided, the computer-readable medium has a program product stored thereon, which can implement the method as described above in the specification. In some possible embodiments of the present disclosure, various aspects of the present disclosure can be implemented in a form a program product, which comprises program codes, which, executed on a terminal device, is configured to cause the terminal device to perform the steps of the various exemplary embodiments of the present disclosure described in in the "Exemplary Method" section of the present specification.

Figure 25:
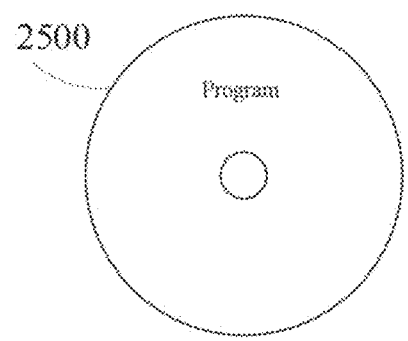
FIG. 25 schematically illustrates a block diagram of a machine-readable storage medium according to an exemplary embodiment of the present disclosure.

Referring to FIG. 25, a program product 2500 according to embodiments of the present disclosure for implementing the above method is depicted, which can employ a portable compact disk read only memory (CD-ROM) and comprises program codes, and can be run on a terminal device such as a personal computer, is illustrated. However, the program product according to the present disclosure is not limited thereto, and in the present document, the readable storage medium can be any tangible medium containing or storing a program that can be used by or in connection with an instruction execution system, device or apparatus.

The program product can employ any combination of one or more readable media. The readable medium can be a readable signal medium or a readable storage medium. The readable storage medium can be, for example, but not limited to, a system, an apparatus, or a device of an electronic, magnetic, optical, electromagnetic, infrared, or semiconductor system, or any combination of the above. More specific examples (non-exhaustive lists) of readable storage media comprise: electrical connections with one or more wires, portable disks, hard disks, random access memory (RAM), read only memory (ROM), erasable Programmable read-only memory (EPROM or flash memory), optical fiber, portable compact disk read only memory (CD-ROM), optical storage device, magnetic storage device, or any suitable combination of the foregoing.

The computer readable signal medium can comprise a data signal that is propagated in the baseband or as part of a carrier, and carries readable program codes. Such propagated data signal can take a variety of forms comprises, but not limited to, electromagnetic signals, optical signals, or any suitable combination of the foregoing. The readable signal medium can be any readable medium except the readable storage medium, and the readable medium can send, propagate, or transmit a program used by or in conjunction with an instruction executing system, apparatus, or device.

Program code comprised in a readable medium can be transmitted using any suitable medium, comprising but not limited to wireless, wire, optical cable, RF and etc., or any suitable combination of the foregoing.

Program code for performing the operations of the present disclosure can be programmed in one or any combination of more programming languages, the programming languages comprise an character oriented programming language such as Java, C++, etc., and further comprises conventional procedural Programming language-such as the "C" language or a similar programming language. The program code can be executed entirely or partially on a user computing device, or as a stand-alone software package, or partially on the remote computing device on the user computing device and partially on a remote computing device, or entirely on a remote computing device or a server. In the case of involving a remote computing device, the remote computing device can be connected to the user computing device via any kind of network, comprising a local area network (LAN) or wide area network (WAN), or to an external computing device (e.g., via internet provided by an internet service provider).

Further, the above-described drawings are merely illustrative of the processing comprises in the method according to the exemplary embodiments of the present disclosure, and are not intended to limit the present disclosure. It can be easily understood that the processes illustrated in the above figures does not indicate or limit the chronological order of these processes. In addition, it can also be easily understood that these processes can be performed synchronously or asynchronously, for example, in a plurality of modules.

Other embodiments of the present disclosure will be apparent to one of ordinary skill in the art. The present disclosure is intended to cover any variations, applications, or adaptive modifications of the present disclosure, which are in accordance with the general principles of the disclosure and comprise common general knowledge or common technical means in the art that are not disclosed in the present disclosure. The specification and embodiments are merely illustrative, and the protection scope and the spirit of the present disclosure are set forth by the claims.

It should be understood that the present disclosure are not limited to the details illustrated in the figures and described in the specification, and various variations and modifications can be made without departing the scope of the present disclosure. And the scope of the present disclosure is only limited by the appended claims. The scope of the disclosure is to be limited only by the appended claims.

What is claimed is:

1. A virtual character processing method, comprising:
    generating a first virtual skill region in response to a first touch operation on a virtual skill button on a user interface corresponding to a current device operated by a current player, and superimposing the first virtual skill region on the virtual skill button;
    identifying a plurality of virtual characters in the current view field and survival coefficients of the plurality of virtual characters, wherein the plurality of virtual characters comprise friend characters or enemy characters with respect to a player character controlled by the current player;
    dividing the first virtual skill region into a plurality of subregions corresponding to the plurality of virtual characters based on the virtual characters and the survival coefficients wherein a number of the plurality of subregions is equal to a number of the plurality of virtual characters;
    in response to a selection operation on a subregion of the plurality of regions, determining a virtual character corresponding to the selected subregion as a target character and locking the target character.

2. The virtual character processing method according to claim 1, wherein the method further comprises:
    providing a first sighting scope model; and
    adjusting an aiming direction of the first sighting scope model according to a second touch operation on a first preset region on the user interface.

3. The virtual character processing method according to claim 2, wherein, after response to the first touch operation on the virtual skill button on the user interface, the method further comprises:
    identifying a closest virtual character to the first sighting scope model as the target character.

4. The virtual character processing method according to claim 3, wherein the method further comprises:
    controlling the view field to move to a direction in which the target character moves, if the target character moves to outside of the current view field.

5. The virtual character processing method according to claim 2, wherein, after response to the touch operation on the virtual skill button on the user interface, the method further comprises:
    generating a second sighting scope model on the first sighting scope model, wherein a virtual character aimed by the second sighting scope model is the target character.

6. The virtual character processing method according to claim 5, wherein the method further comprises:
    in response to the selection operation on the plurality of subregions, determining a position of the second sighting scope model according to the selection operation; and
    identifying the target character according to the position of the second sighting scope model.

7. The virtual character processing method according to claim 1, wherein dividing the first virtual skill region into a plurality of subregions corresponding to the plurality of virtual characters based on the virtual characters and the survival coefficients comprises
    dividing the first virtual skill region into a plurality of subregions having the same area and with a same number as the number of the plurality of virtual characters, if the survival coefficients of the plurality of virtual characters are the same; and
    dividing the first virtual skill region into a plurality of subregions having different areas and with a same number as the number of the plurality of virtual characters, if the survival coefficients of the plurality of virtual characters are different.

8. The virtual character processing method according to claim 1, wherein a second virtual skill region is immediately adjacent to the first virtual skill region, the method further comprises:
    moving the view field along a direction in which the touch operation moves, if the touch operation is located outside the first virtual skill region and within the second virtual skill region.

9. The virtual character processing method according to claim 8, wherein the method comprises:
    when the touch operation returns to the first virtual skill region from the second virtual skill region, controlling a position of the first virtual skill region to change so that a relative position of a new target character in the view field is in consistent with a relative position of the virtual skill button in the first virtual skill region.

10. The virtual character processing method according to claim 9, wherein the method further comprises:
    determining a region formed by the first virtual skill region and the second virtual skill region as a third virtual skill region;
    canceling releasing a skill to the target character, if no touch operation is detected outside the third virtual skill region; and
    releasing a skill to the target character, if no touch operation is detected in the third virtual skill region.

11. The virtual character processing method according to claim 1, wherein dividing the first virtual skill region into a plurality of subregions based on the virtual characters and the survival coefficients comprises dividing the first virtual skill region into the plurality of subregions based on a number of the enemy characters and the survival coefficients of the enemy characters.

12. The virtual character processing method according to claim 1, wherein an area of each of the plurality of subregions is determined based on a survival coefficient of the enemy character corresponding to the subregion.

13. A computer readable medium having a computer program stored thereon, when executed by the processor, the computer program implements the virtual character processing method according to claim 1.

14. An electronic device, comprising:
    a processor; and
    a memory having computer readable instructions stored thereon, when executed by the processor, the processor is configured to:
    generate a first virtual skill region in response to a first touch operation on a virtual skill button on a user interface corresponding to a current device operated by a current player, and superimposing the first virtual skill region on the virtual skill button;
    identify a plurality of virtual characters in the current view field and survival coefficients of the plurality of virtual characters, wherein the plurality of virtual characters comprise friend characters or enemy characters with respect to a player character controlled by the current player;

divide the first virtual skill region into a plurality of subregions corresponding to the plurality of virtual characters based on the virtual characters and the survival coefficients wherein a number of the plurality of subregions is equal to a number of the plurality of virtual characters;

in response to selection operation on a subregion of the plurality of regions, determining a virtual character corresponding to the selected subregion as a target character and locking the target character.

15. The electronic device according to claim 14, wherein the processor is further configured to:

provide a first sighting scope model; and adjust an aiming direction of the first sighting scope model according to a second touch operation on a first preset region on the user interface.

16. The electronic device according to claim 15, wherein, after response to the first touch operation on the virtual skill button on the user interface, the processor is configured to:

identify a closest virtual character to the first sighting scope model as the target character.

17. The electronic device according to claim 16, wherein the process is configured to control the view field to move to a direction in which the target character moves, if the target character moves to outside of the current view field.

18. The electronic device according to claim 15, wherein, after response to the touch operation on the virtual skill button on the user interface, the processor is configured to:

generate a second sighting scope model on the first sighting scope model, wherein a virtual character aimed by the second sighting scope model is the target character.

19. The electronic device according to claim 15, wherein the processor is further configured to:

in response to the selection operation on the plurality of subregions, determine a position of the second sighting scope model according to the selection operation; and identify the target character according to the position of the second sighting scope model.

20. The electronic device according to claim 14, wherein when configured to divide the first virtual skill region into a plurality of subregions corresponding to the plurality of virtual character based on the virtual characters and the survival coefficients, the processor is configured to:

divide the first virtual skill region into a plurality of subregions having the same area and with a same number as the number of the plurality of virtual characters, if the survival coefficients of the plurality of virtual characters are the same; and divide the first virtual skill region into a plurality of subregions having different areas and with a same number as the number of the plurality of virtual characters, if the survival coefficients of the plurality of virtual characters are different.

* * * * *